United States Patent
Hu et al.

(10) Patent No.: US 12,529,774 B2
(45) Date of Patent: Jan. 20, 2026

(54) ONLINE LIDAR-TO-GROUND ALIGNMENT

(71) Applicant: GM GLOBAL TECHNOLOGY OPERATIONS LLC, Detroit, MI (US)

(72) Inventors: Yao Hu, Sterling Heights, MI (US); Xinyu Du, Oakland Township, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 978 days.

(21) Appl. No.: 17/676,284

(22) Filed: Feb. 21, 2022

(65) Prior Publication Data

US 2023/0266451 A1  Aug. 24, 2023

(51) Int. Cl.
*G01S 7/497* (2006.01)
*G01S 7/48* (2006.01)
*G01S 17/42* (2006.01)
*G01S 17/931* (2020.01)
*G01S 17/86* (2020.01)

(52) U.S. Cl.
CPC .......... *G01S 7/4972* (2013.01); *G01S 7/4808* (2013.01); *G01S 17/42* (2013.01); *G01S 17/931* (2020.01); *G01S 17/86* (2020.01)

(58) Field of Classification Search
None
See application file for complete search history.

(56) References Cited

U.S. PATENT DOCUMENTS

| | | | | |
|---|---|---|---|---|
| 2019/0258251 A1* | 8/2019 | Ditty | .................... | G05D 1/0274 |
| 2021/0109204 A1* | 4/2021 | Liao | .......................... | G06T 7/80 |
| 2021/0334988 A1* | 10/2021 | Xiao | .................... | G06F 18/2193 |
| 2021/0373138 A1 | 12/2021 | Jiang et al. | | |
| 2023/0083965 A1* | 3/2023 | Liu | .......................... | G06T 7/74 |
| | | | | 382/103 |

(Continued)

FOREIGN PATENT DOCUMENTS

| CN | 108454625 A | 8/2018 |
|---|---|---|
| CN | 111532257 A | 8/2020 |
| CN | 111771206 A | 10/2020 |

(Continued)

OTHER PUBLICATIONS

English translation of CN-112560747-A, retrieved from Espacenet on Mar. 25, 2025 (Year: 2025).*

(Continued)

*Primary Examiner* — Amelia Vorce (57) ABSTRACT

A LIDAR-to-vehicle alignment system includes a sensor data collection module configured to collect points of data provided based on outputs of one or more LIDAR sensors. An alignment module is configured to identify lane markings based on the points of data, determine a lane marking direction based on the identified lane markings, calculate a yaw of a LIDAR coordinate system relative to a vehicle coordinate system based on the determined lane marking direction, and identify a ground plane based on the points of data. The alignment module is also configured to calculate a roll and pitch of the LIDAR coordinate system relative to the vehicle coordinate system based on the identified ground plane, and update a transformation matrix based on the calculated yaw, roll, and pitch of the LIDAR coordinate system.

20 Claims, 5 Drawing Sheets

(56) References Cited

U.S. PATENT DOCUMENTS

2023/0384436 A1* 11/2023 Yoshida ................ G01S 7/4817
2024/0069206 A1* 2/2024 Isidro .................... B60W 50/00

FOREIGN PATENT DOCUMENTS

| CN | 112560747 A | * | 3/2021 |
| CN | 113589243 A | * | 11/2021 |
| WO | WO-2019151109 A1 | * | 8/2019 |
| WO | WO-2021179983 A1 | * | 9/2021 |
| WO | WO-2021179988 A1 | * | 9/2021 |

OTHER PUBLICATIONS

English translation of CN-113589243-A, retrieved from Espacenet on Mar. 25, 2025 (Year: 2025).*
English translation of WO-2021179983-A1, retrieved from Espacenet on Mar. 25, 2025 (Year: 2025).*
Chinese Office Action for Chinese Application No. 202211268836 dated Sep. 3, 2025.

* cited by examiner

ONLINE LIDAR-TO-GROUND ALIGNMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle object detection systems, and more particularly to vehicle light detection and ranging (LIDAR) systems.

Vehicles can include various sensors for detecting a surrounding environment and objects in that environment. The sensors may include cameras, radio detection and ranging (RADAR) sensors, LIDAR sensors, etc. A vehicle controller can, in response to the detected surroundings, perform various operations. The operations can include performing partial and/or fully autonomous vehicle operations, collision avoidance operations, and informational reporting operations. The accuracy of the performed operations can be based on the accuracy of the data collected from the sensors.

SUMMARY

A LIDAR-to-vehicle alignment system includes a sensor data collection module configured to collect points of data provided based on outputs of one or more LIDAR sensors and an alignment module configured to identify lane markings based on the points of data, determine a lane marking direction based on the identified lane markings, calculate a yaw of a LIDAR coordinate system relative to a vehicle coordinate system based on the determined lane marking direction, identify a ground plane based on the points of data, calculate a roll and pitch of the LIDAR coordinate system relative to the vehicle coordinate system based on the identified ground plane, and update a transformation matrix based on the calculated yaw, roll, and pitch of the LIDAR coordinate system.

In other features, the system further includes an autonomous driving module configured to perform one or more autonomous driving operations based on the transformation matrix.

In other features, the alignment module is configured to determine whether at least one enablement condition is met prior to calculating the yaw, roll, and pitch of the LIDAR coordinate system.

In other features, the alignment module is configured to identify the lane markings based on an intensity threshold.

In other features, the alignment module is configured to dynamically determine the intensity threshold based on intensities of points of data in a predetermined region of interest.

In other features, the alignment module is configured to determine the lane marking direction using principal component analysis.

In other features, the alignment module is configured to determine a normal to the ground plane and calculate the roll and the pitch based on the normal to the ground plane.

In other features, the alignment module is configured to determine the normal to the ground plane using principal component analysis.

In other features, the alignment module is configured to identify statistical outliers in the calculated yaw, roll, and pitch and remove the statistical outliers from the update to the transformation matrix.

A method of performing LIDAR-to-vehicle alignment includes collecting points of data provided based on outputs of one or more LIDAR sensors, identifying lane markings based on the points of data, determining a lane marking direction based on the identified lane markings, calculating a yaw of a LIDAR coordinate system relative to a vehicle coordinate system based on the determined lane marking direction, identifying a ground plane based on the points of data, calculating a roll and pitch of the LIDAR coordinate system relative to the vehicle coordinate system based on the identified ground plane, and updating a transformation matrix based on the calculated yaw, roll, and pitch of the LIDAR coordinate system.

In other features, the method further includes performing one or more autonomous driving operations based on the transformation matrix.

In other features, the method further includes determining whether at least one enablement condition is met prior to calculating the yaw, roll, and pitch of the LIDAR coordinate system.

In other features, the method further includes identifying the lane markings based on an intensity threshold.

In other features, the method further includes dynamically determining the intensity threshold based on intensities of points of data in a predetermined region of interest.

In other features, the method further includes determining the lane marking direction using principal component analysis.

In other features, the method further includes determining a normal to the ground plane and calculating the roll and the pitch based on the normal to the ground plane.

In other features, the method further includes determining the normal to the ground plane using principal component analysis.

In other features, the method further includes identifying statistical outliers in the calculated yaw, roll, and pitch and removing the statistical outliers from the update to the transformation matrix.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An autonomous driving module may perform sensor alignment and fusion operations, perception and localization operations, and path planning and vehicle control operations. The stated operations may be performed based on data collected from various sensors, such as LIDAR sensors, RADAR sensors, cameras, and an inertial measurement sensor (or inertial measurement unit), and data collected from a global positioning system (GPS). Sensor alignment and fusion may include alignment of a coordinate system of each sensor with a reference coordinate system, such as a vehicle coordinate system. Fusion may refer to the collecting and combining of the data from the various sensors.

Perception refers to the monitoring of vehicle surroundings and the detection and identification of various features and/or objects in the surroundings. This can include determining various aspects of the features and objects. The term "feature" as used herein refers to one or more detected points that can be reliably used to determine a location of an object. This is unlike other data points detected, which do not provide reliable information regarding location of an object (e.g., a point on a leaf or branch of a tree). The aspects determined may include object distances, locations, sizes, shapes, orientations, trajectories, etc. This may include determining the type of object detected, such as, for example, whether the object is a traffic sign, a vehicle, a pole, a pedestrian, a ground surface, etc. Lane marking information may also be detected. A feature may refer to a surface, edge, or corner of a building. Localization refers to information determined about a host vehicle, such as location, speed, heading, etc. Path planning and vehicle control (e.g., braking, steering, and accelerating) are performed based on the gathered perception and localization information.

A vehicle may include multiple LIDAR sensors. LIDAR sensor alignment including LIDAR-to-vehicle alignment and LIDAR-to-LIDAR alignment affects accuracy of determined perception and localization information including feature and object information, such as that described above. GPS measurements are used for vehicle localization, mapping, and LIDAR alignment.

Data collected from different LIDAR sensors is transformed (or projected) to the same coordinate system prior to being evaluated. For example, the LIDAR data may be transformed to a vehicle coordinate system or a world coordinate system. The accuracy of this transformation is based on the state of alignment of the alignment system. In one example, the alignment refers to whether entries in an alignment or transformation matrix, which is used to transform LIDAR coordinate data to vehicle coordinate data, are valid. The transformation matrix may be used to transform coordinates in the vehicle coordinate system to LIDAR coordinate data. The alignment can become degraded or incorrect over time, such that the entries of the transformation matrix are no longer valid. For example, the alignment can become degraded due to misalignment of a sensor, vibration of a sensor, an accident, etc. Realignment of the LIDAR sensors may be performed offline at an alignment service center by a trained service technician using special equipment. A customer of a vehicle typically cannot perform an offline alignment of the LIDAR sensors.

Aggregation of LIDAR frames includes using localization data, such as GPS data and data from an inertial measurement unit (IMU), LIDAR data and a LIDAR-to-vehicle coordinate alignment transformation matrix. The transformation matrix is used to provide resultant data in a vehicle coordinate system. If no alignment is performed, then a resultant image is blurred due to errors in the transformation matrix. Misalignment can cause errors when performing, for example, autonomous vehicle maneuvers, object detection, collision avoidance, etc.

Alignment systems and methods according to the present disclosure are configured to determine LIDAR alignment based on LIDAR-to-vehicle alignment estimates (e.g., a LIDAR alignment relative to a vehicle coordinate system that is estimated based on LIDAR alignment to environmental features). As one example, the vehicle coordinate system is determined based on LIDAR alignment relative to lane markings and a ground plane. For example, alignment relative to lane markings is indicative of yaw while alignment relative to the ground plane is indicative of roll and pitch. The transformation matrix is updated in accordance with the determined LIDAR alignment relative to the vehicle coordinate system. In further examples, the impact of vehicle misalignment relative to the ground plane and the lane markings can be reduced by correcting for variations in suspension behavior, heading angle, etc.

Figure 1:
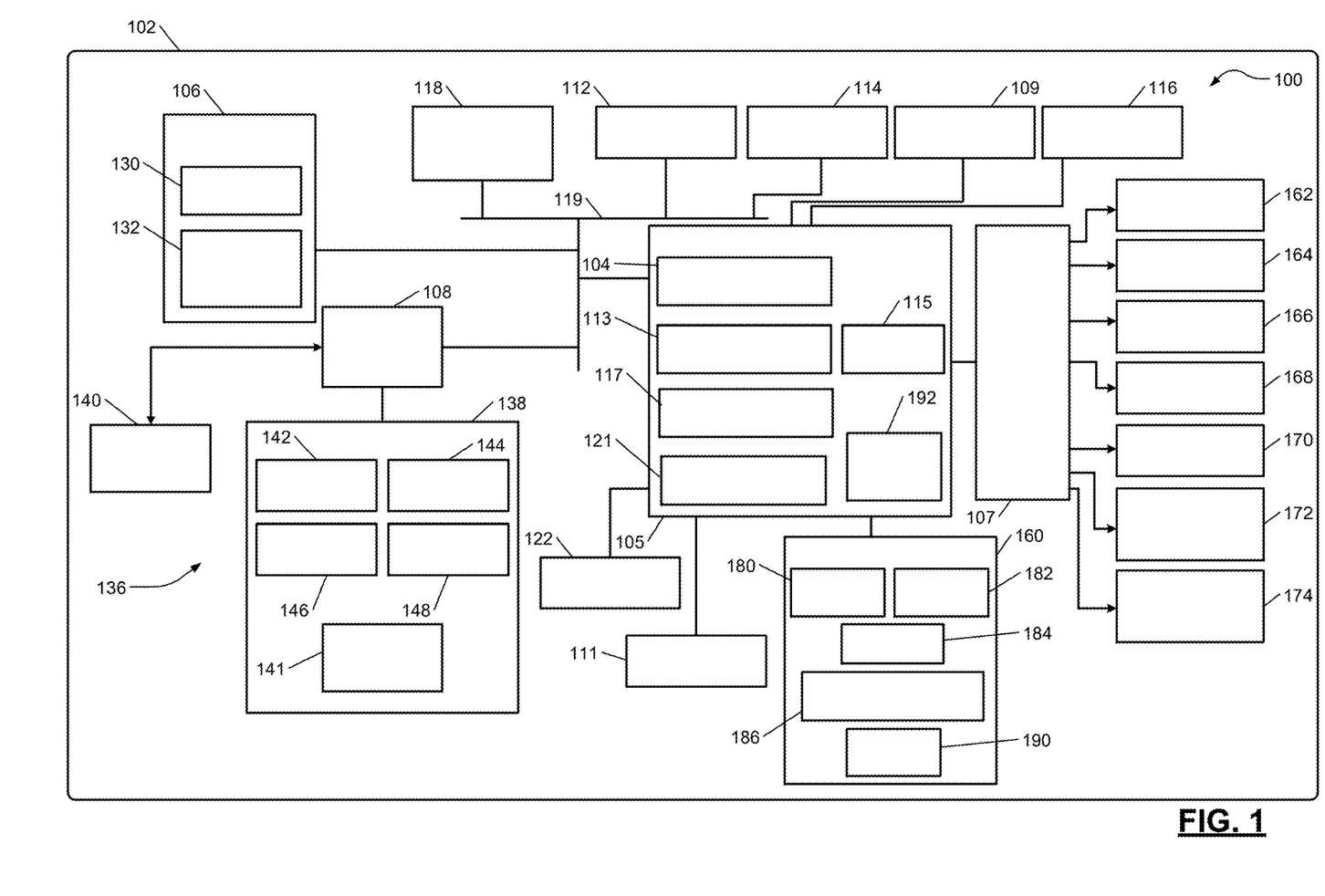
FIG. 1 is a functional block diagram of an example vehicle system including an alignment validation module in accordance with the present disclosure.

FIG. 1 shows an example vehicle system 100 of a vehicle 102 including an alignment module 104 (e.g., an online alignment module) according to the present disclosure. Operations performed by the alignment module 104 are further described below with respect to FIGS. 1-5B. The vehicle system 100 may include an autonomous driving module 105, a body control module (BCM) 107, a telematics module 106, a propulsion control module 108, a power steering system 109, a brake system 111, a navigation system 112, an infotainment system 114, an air-conditioning system 116, and other vehicle systems and modules 118. The autonomous driving module 105 includes the alignment module 104, a fusion module 113, a perception module 115, a mapping and localization module 117, and a path planning module 121. The mapping and localization module 117 may include a GPS correction module. Operations of these modules are further described below.

The modules and systems 104-108, 112-115, 118, and 121 may communicate with each other via a controller area network (CAN) bus, an Ethernet network, a local interconnect network (LIN) bus, another bus or communication network and/or wirelessly. Item 119 may refer to and/or include a CAN bus, an Ethernet network, a LIN bus and/or other bus and/or communication network. This communication may include other systems, such as systems 109, 111, 116. A power source 122 may be included and power the autonomous driving module 105 and other systems, modules, devices and/or components. The power source 122 may include an accessory power module, one or more batteries, generators and/or other power sources.

The telematics module 106 may include transceivers 130 and a telematics control module 132. The propulsion control module 108 may control operation of a propulsion system 136 that may include an engine system 138 and/or one or more electric motor(s) 140. The engine system 138 may include an internal combustion engine 141, a starter motor 142 (or starter), a fuel system 144, an ignition system 146, and a throttle system 148.

The autonomous driving module 105 may control the modules and systems 106, 108, 109, 111, 112, 114, 116, 118 and other devices and systems based on data from sensors 160. The other devices and systems may include window and door actuators 162, interior lights, 164, exterior lights 166, trunk motor and lock 168, seat position motors 170, seat temperature control systems 172, and vehicle mirror motors 174. The sensors 160 may include temperature sensors, pressure sensors, flow rate sensors, position sensors, etc. The sensors 160 may include LIDAR sensors 180, RADAR sensors 182, cameras 184, inertial measurement sensor 186, GPS sensors 190, and/or other environment and feature detection sensors. The GPS sensors 190 may be implemented as part of the navigation system 112. The LIDAR sensors 180, the inertial measurement sensor 186, and the GPS sensors 190 may provide the LIDAR data points, inertial measurement data and GPS data referred to below.

The autonomous driving module 105 may include memory 192, which may store sensor data, historical data, alignment information, etc. The memory 192 may include dedicated buffers, referred to below.

Figure 2:
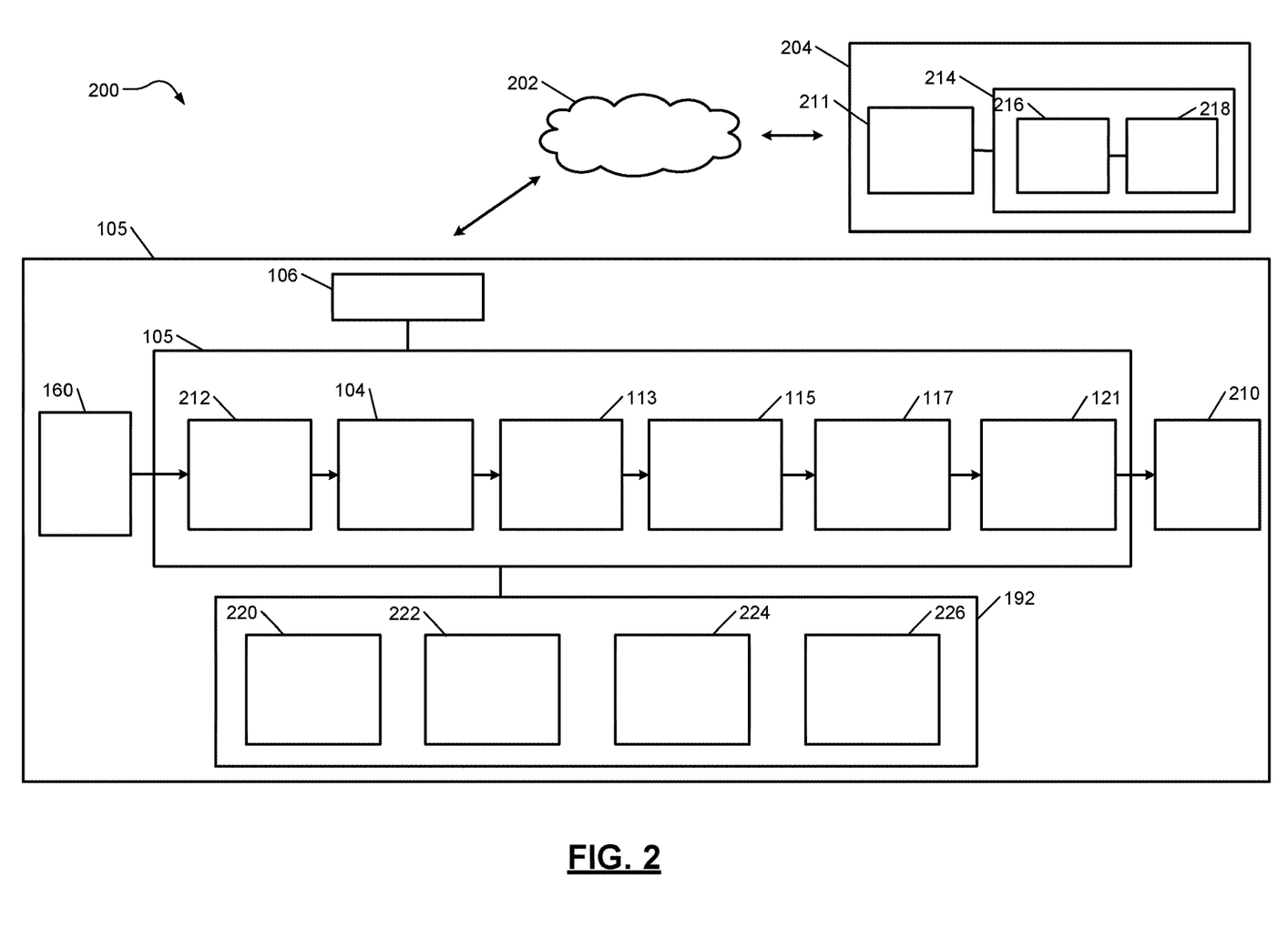
FIG. 2 is a functional block diagram of an example alignment system including a vehicle and a back office in accordance with the present disclosure.

FIG. 2 shows an example alignment system 200 including a first (or host) vehicle (e.g., the vehicle 102 of FIG. 1) and/or other vehicles, a distributed communications network 202 and a back office 204. The host vehicle includes the autonomous driving module 105, the vehicles sensors 160, the telematics module 106, and actuators 210. The actuators 210 may include motors, drivers, valves, switches, etc.

The back office 204 may be a central office that provides services for the vehicles including data collection and processing services. The back office 204 may include a transceiver 211 and a server 214 with a control module 216 and memory 218. In addition or as an alternative, the vehicles may be in communication with other cloud-based network devices other than the server.

The autonomous driving module 105 may include a sensor data collection module 212, the alignment module 104, the fusion module 113, the perception module 115, the mapping and localization module 117 and the path planning module 121. The sensor data collection module 212 may collect data from the sensors 160 including LIDAR data from multiple LIDAR sensors. The alignment module 104 may perform sensor alignment operations, as further described below, based on outputs of the sensors 160 (e.g., the sensors 180, 182, 184, 186, 190). The fusion module 113 aggregates the data received from the difference sensors after being transformed to, for example, vehicle or world coordinates. The aggregation may be time based.

The alignment module 104 determines whether LIDAR sensors and/or other sensors are aligned, meaning differences in information provided by the LIDAR sensors and/or other sensors for the same one or more features and/or objects are within predetermined ranges of each other. The alignment module 104 may determine difference values for six degrees of freedom of the LIDAR sensors including roll, pitch, yaw, x, y, and z difference values and determines whether the LIDAR sensors are aligned accordingly. The x coordinate may refer to a fore and aft or longitudinal horizontal direction. The y coordinate may refer to a lateral (e.g., left and right) direction. The z direction may refer to a vertical direction. The x, y, z coordinates may be switched and/or defined differently. If not aligned, one or more of the LIDAR sensors may be recalibrated and/or an alignment process as further described below may be performed.

The perception module 115 may perform perception operations based on the transformed and aggregated sensor data provided from the fusion module 113. The received data may be used to determine aspects of an environment surrounding a corresponding host vehicle (e.g., the vehicle 102 of FIG. 1). This may include (i) generating perception information as stated above, and/or (ii) detection and identification of features and objects, if not already performed, and determining locations, distances, and trajectories of the features and objects relative to the host vehicle 102. The mapping and localization module 117 map perform GPS mapping and localization operations including real-time GPS positioning, which refers to providing GPS information for a current location of the host vehicle.

The path planning module 121 may determine a path for the vehicle based on an output of the mapping and localization module 117. The path planning module 121 may perform autonomous vehicle operations including controlling operations of the vehicle 102 based on the determined path including controlling operations of the power steering system 109, the propulsion control module 108, the brake system 111 and/or other systems and devices of FIG. 1. This may include controlling operation of the actuators 210 and/or performing reporting information, generating alert messages, alerting nearby vehicles, etc. The autonomous vehicle operations may include collision avoidance operations and/or informational reporting operations.

The autonomous driving module 105 may operate in an offline mode or an online mode. The offline mode refers to when the back office 204 collects data and performs data processing for the autonomous driving module 105 (e.g., when the vehicle is not presently being driven). This may include, for example, collecting GPS data from the vehicle 102 and performing GPS positioning correction and LIDAR alignment for data annotation and providing corrected GPS data and data annotation back to the autonomous driving module 105. A neural network of the autonomous driving module 105 may be trained based on the data annotation. GPS position corrections may be made prior to data annotation. Although not shown in FIG. 2, the control module 216 of the server 214 may include one or more of the modules 212, 104, 113 and/or perform similar operations as one or more of the modules 212, 104 and/or 113.

During the offline mode, the server 214 processes data previously collected over an extended period of time. During the online mode (e.g., when the vehicle is presently being driven), the autonomous driving module 105 performs GPS positioning correction and/or the LIDAR alignment. This may be implemented with or without aid of a cloud-based network device, such as the server 214. During the online mode, the autonomous driving module 105 is performing real-time GPS positioning and LIDAR alignment using collected and/or historical data. This may include data collected from other vehicles and/or infrastructure devices. The cloud-based network device may provide historical data, historical results, and/or perform other operations to aid in the real-time GPS positioning and LIDAR alignment. The real-time GPS positioning refers to providing GPS information for a current location of the host vehicle. LIDAR alignment information is generated for a current state of one or more LIDAR sensors.

The modules 105, 212, 104, 113, 115, 117, 121 may access the memory 192. The memory 192 may include, for example, a raw data buffer 220, a target data buffer 222, a result transformation matrix buffer 224, and other buffers 226. The raw data buffer 220 may store raw data collected from sensors, such as the LIDAR sensors 180 of FIG. 1. The target data buffer 222 may store data associated with one or more selected targets. The result transformation matrix buffer 224 may store a determined transformation matrix determined using various methods and algorithms.

Figure 3A:
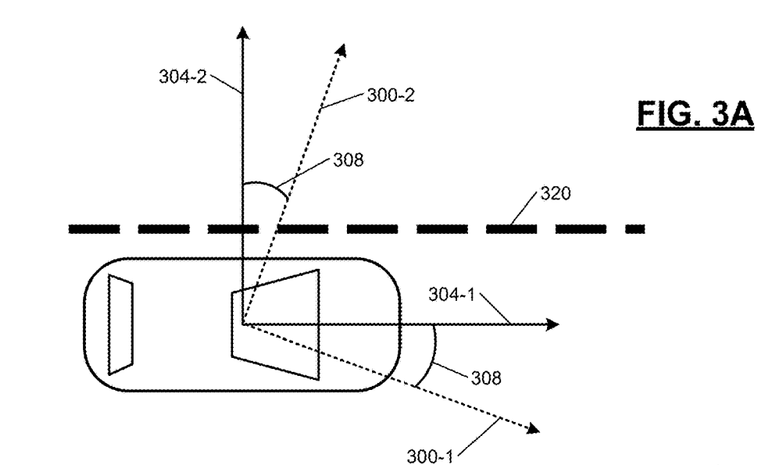
FIGS. 3A, 3B, and 3C illustrate yaw, pitch, and roll of LIDAR alignment relative to a vehicle coordinate system.
Figure 3B:
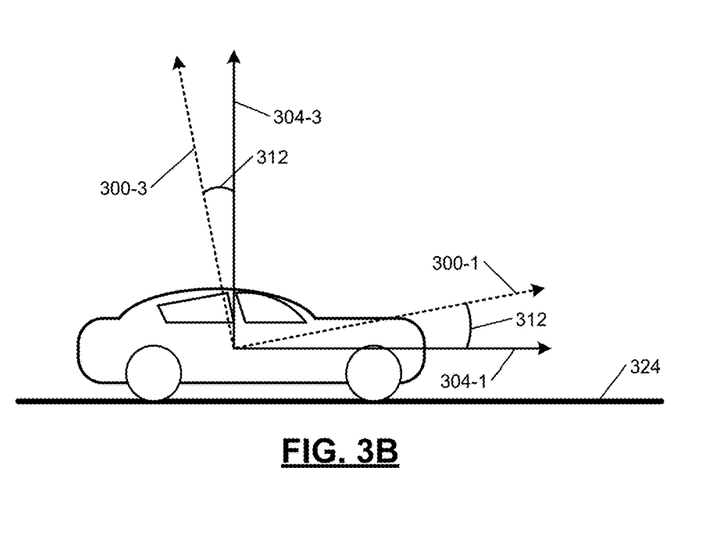
Figure 3C:
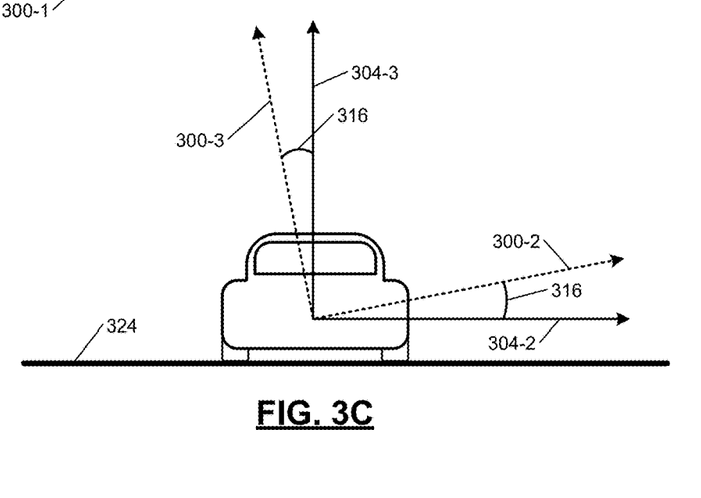

FIGS. 3A, 3B, and 3C illustrate yaw, pitch, and roll of LIDAR alignment (e.g., a LIDAR coordinate system including an x axis 300-1, a y axis 300-2, and a z-axis 300-3, referred to collectively as a LIDAR coordinate system 300) relative to a vehicle coordinate system (e.g., a vehicle coordinate system including an x axis 304-1, a y axis 304-2, and a z-axis 304-3, referred to collectively as a vehicle coordinate system 304). Yaw refers to alignment or offset of the LIDAR x axis 300-1 relative to the vehicle x axis 304-1 in a horizontal direction or the LIDAR y axis 300-2 relative to the vehicle y axis 304-2 in a horizontal direction as indicated at 308 in FIG. 3A. Pitch refers to alignment or offset of the LIDAR x axis 300-1 relative to the vehicle x axis 304-1 in a vertical direction or the LIDAR z axis 300-3 relative to the vehicle y axis 304-3 in a forward or backward horizontal direction (i.e., along an x axis of the vehicle) as indicated at 312 in FIG. 3B. Roll refers to alignment or offset of the LIDAR y axis 300-2 relative to the vehicle x axis 304-2 in a vertical direction or the LIDAR z axis 300-3 relative to the vehicle z axis 304-3 in a lateral horizontal direction (i.e., along a y axis of the vehicle) as indicated at 316 in FIG. 3B.

The alignment module 104 according to the present disclosure is configured to determine a LIDAR alignment (i.e., yaw, pitch, and roll of the LIDAR coordinate system 300) relative to the vehicle coordinate system 304 based on (i) environmental features and (ii) an identification (e.g., a determination or calculation) of the vehicle coordinate system 304 based on the environmental features. As one example, the environmental features include lane markings 320 and a ground plane 324. The alignment module 104 identifies the lane markings 320, determines the x axis 304-1 and/or y axis 304-2 of the vehicle coordinate system 304 based on the lane markings 320, and calculates the yaw 308 based on the determined x axis 304-1 and/or y axis 304-2.

Conversely, the alignment module 104 identifies the ground plane 324, determines the x axis 304-1 and/or z axis 304-3 of the vehicle coordinate system 304 based on the ground plane 324, and calculates the pitch 312 based on the determined x axis 304-1 and/or z axis 304-3. Similarly, the alignment module 104 determines the y axis 304-2 and/or z axis 304-3 of the vehicle coordinate system 304 based on the ground plane 324 and calculates the roll 316 based on the determined y axis 304-2 and/or z axis 304-3.

Figure 4:
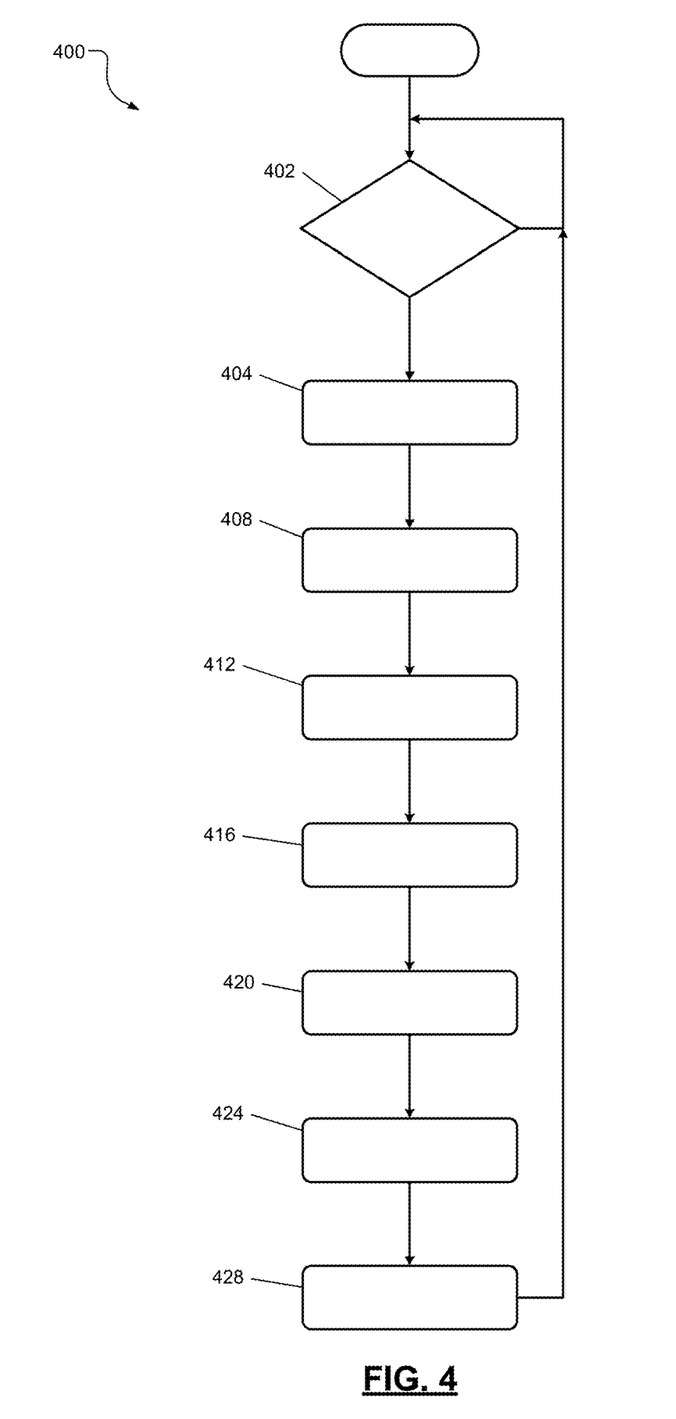
FIG. 4 illustrates steps of an example method of determining LIDAR alignment according to the present disclosure.

Referring now to FIG. 4, an example method 400 of determining LIDAR alignment (e.g., as executed by the alignment module 104 and other components of the autonomous driving module 105) according to the present disclosure is shown. At 402, the method 400 determines whether enablement conditions of the vehicle are met. If true, the method 400 continues to 404. If false, the method 400 repeats step 402.

For example, data collected during certain driving conditions may interfere with accurate calculation of LIDAR alignment. As one example, vehicle speeds below a first threshold (e.g., 10 mph) or above a second threshold (e.g., 70 mph) may cause vehicle yaw, pitch, and/or roll to be misaligned with relied upon environmental features (e.g., lane markings and a ground plane). As another example, vehicle acceleration, braking, turning, etc. may cause vehicle yaw, pitch, and/or roll to be misaligned with relied upon environmental features. As still another example, an uneven road surface (e.g., bumps or other features affecting vehicle suspension behavior) may cause vehicle yaw, pitch, or roll to be misaligned with relied upon environmental features. Accordingly, at 402, the method 400 may determines whether vehicle speed is within a predetermined range, the vehicle is not accelerating, decelerating, or turning, and the road surface is substantially flat.

At 404, the method 400 identifies lane markings on a road. For example, the method 400 collects sensor data captured from an environment (e.g., in an environment on either side of a vehicle), extracts features from the sensor data indicative of lane markings, and identifies the lane markings based on the extracted features. In other words, the method 400 identifies specific features in the sensor data that indicate lane markings and disregards features that are not consistent with lane markings. Although shown as a single step 404, the method 400 collects the sensor data over a plurality of frames. In other words, the sensor data does not correspond to a single sample or frame of the environment. Instead, the method 400 collects the sensor data over a predetermined period (e.g., a plurality of sequential timestamped frames) to establish a straight line of features indicative of the lane markings.

At 408, the method 400 determines a lane marking direction or heading (i.e., a straight line or vector corresponding to the lane markings) based on the identified lane markings. In one example, the method 400 determines the lane marking direction using a principal component analysis (PCA).

Figure 5A:
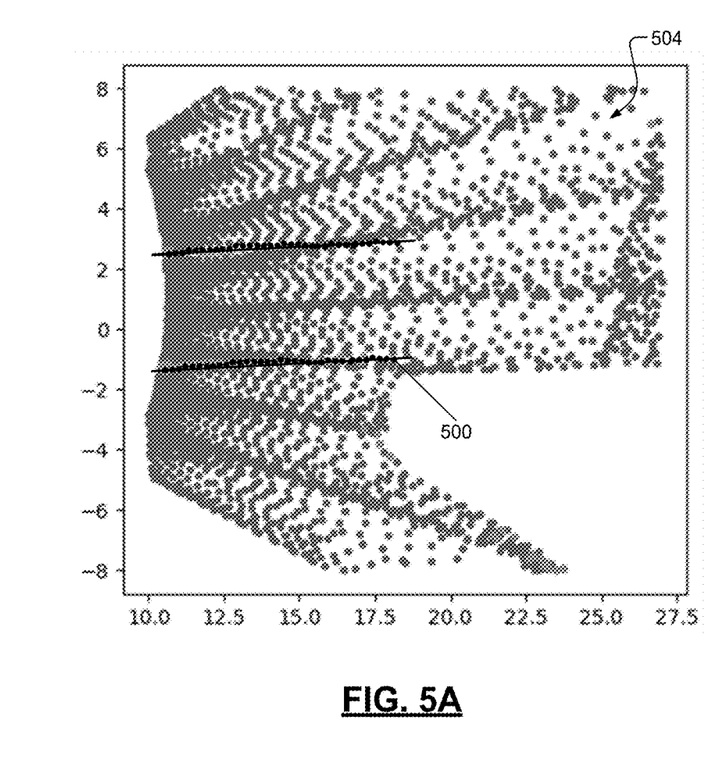
FIG. 5A illustrates example identification of lane markings from collected sensor data according to the present disclosure.

An example of lane markings 500 identified in a point cloud 504 of collected sensor data (e.g., over a plurality of frames) is shown in FIG. 5A. The point cloud 504 comprises a set of points each corresponding to a feature detected by one or more LIDAR sensors in a region of interest (e.g., a rectangular region or box located a predetermined distance in front of and/or to the sides of the vehicle). Plane fitting may be performed to remove points in the point cloud that are not located on the road surface. The method 400 identifies selected points in the point cloud 504 as possible lane markings. For example, the method 400 selects lane marking points based on an intensity threshold. More specifically, the method 400 compares an intensity (e.g., a measurement of laser reflection) of each point to the intensity threshold. Points that are greater than the intensity threshold are identified as lane marking points and points that are less than the intensity threshold are discarded.

The intensity threshold according to the present disclosure is dynamic (i.e., not fixed). For example, the intensity threshold may be determined in accordance with a global intensity threshold for all of the points in the point cloud 504. As one example, the intensity threshold is calculated based in part on a mean and/or median intensity of all of the points in the point cloud 504.

As shown in FIG. 5A, points along lines fit to the lane markings 500 correspond to points identified as lane marking points. In other words, points identified as lane marking points are clustered along lines corresponding to the actual lane markings in the environment as captured by the LIDAR sensors. As one example, clusters are identified in accordance with a Kernel Density Estimation (KDE). Clusters that are not consistent with lane markings (e.g., clusters of points that are greater than a predetermined distance from the vehicle, have headings or dimensions inconsistent with lane markings, etc.) are discarded and not considered for lane marking determination. The points in the lane marking clusters are then fit to a line or vector (e.g., using PCA).

At 412, the method 400 calculates a yaw of the LIDAR coordinate system based on the lane marking direction. For example, the method 400 determines a vehicle heading based on the lane marking direction. In one example, the method 400 assumes that the vehicle heading (and, therefore, an x axis of the vehicle) is parallel to the lane marking direction. Accordingly, a calculated yaw relative to the lane marking direction is analogous to a yaw of the LIDAR coordinate system to the vehicle coordinate system. In some examples, the calculation of yaw at 412 may be performed after a rotation of the entire point cloud using the calculation results of roll and pitch at 424, which gives the results of roll, pitch, and yaw in a common Euler angle definition.

At 416, the method 400 identifies a ground plane. For example, the method 400 extracts features from the sensor data indicative of the ground plane and identifies the ground plane based on the extracted features. Similar to step 404, the method 400 collects the sensor data over a plurality of frames to establish a plane of features indicative of the ground plane.

Figure 5B:
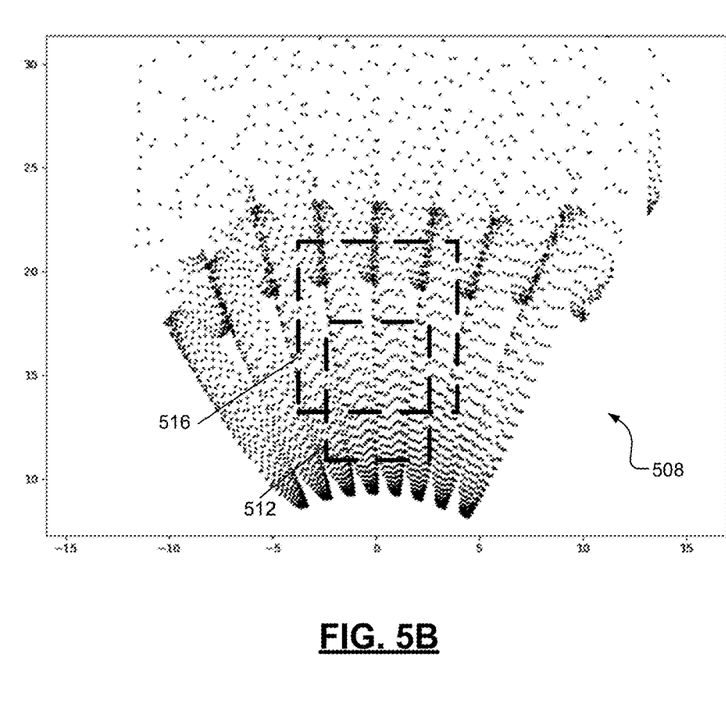
FIG. 5B illustrates example identification of a ground plane from collected sensor data according to the present disclosure.

An example of a point cloud 508 of collected sensor data (e.g., over a plurality of frames) used to determine a ground plane is shown in FIG. 5B. The point cloud 508 comprises a set of points each corresponding to a feature detected by one or more LIDAR sensors in a region of interest (e.g., a rectangular region or box located a predetermined distance in front of and/or to the sides of the vehicle). The method 400 identifies selected points in the point cloud 508 as a possible ground plane. For example, the method 400 selects ground plane points based on a plane fitting method such as random sample consensus (RANSAC). As shown in FIG. 5B, points in a first region 512 (e.g., a narrower region directly adjacent to the vehicle) of an identified ground plane may be used to calculate pitch. Conversely, points in a second region 516 (e.g., a wider region slightly further from the vehicle) of the identified ground plane may be used to calculate roll.

At 420, the method 400 determines a normal vector of (i.e., a line normal to) the ground plane based on the identified ground plane. In one example, the method 400 determines the normal vector using PCA. At 424, the method 400 calculates a roll and pitch of the LIDAR coordinate system based on the ground plane and the normal of the ground plane. For example, the method 400 assumes that the x and axes of the vehicle are parallel to the ground plane and that the z axis of the vehicle is normal to the ground plane. Accordingly, calculated roll and pitch relative to the ground plane and the normal of the ground plane are analogous to roll and pitch of the LIDAR coordinate system relative to the vehicle coordinate system.

At 428, the method 400 updates the LIDAR alignment based on the calculated yaw, roll, and pitch. For example, the method 400 updates a transformation matrix in accordance with the calculated yaw, roll, and pitch of the LIDAR coordinate system relative to the vehicle coordinate system.

Although shown in FIG. 4A as occurring prior to steps 416, 420, and 424, steps 404, 408, and 412 may be performed subsequent to steps 416, 420, and 424, in parallel with steps 416, 420, and 424, etc.

The autonomous driving module 105 performs autonomous driving operations based on LIDAR sensor data and the updated transformation matrix. For example, the autonomous driving module 105 converts points of LIDAR sensor data to vehicle coordinates, world coordinates, etc. and performs autonomous driving operations accordingly.

In some examples, the method 400 may remove statistical outliers from the calculated yaw, roll, and pitch values (e.g., as part of steps 412, 424, and/or 428). For example, as noted above, various environmental and/or vehicle operating factors may cause misalignment of the vehicle relative to the ground plane and the lane markings. Sensor data collected during instances of misalignment may cause statistical outliers. The method 400 is configured to identify and remove outliers accordingly. For example, for a yaw, roll, or pitch calculation, the method 400 may calculate a mean, median, and/or standard deviation of each calculation result and remove calculations that exceed a predetermined standard deviation threshold. The method 400 then calculates the yaw, roll, or pitch based on the mean and/or median of the remaining calculation results.

As described herein, the principles of the present disclosure address LIDAR determination and correction of LIDAR alignment for vehicles and claimed embodiments include an alignment module and/or method configured to specifically address LIDAR alignment for vehicles. Accordingly, the claimed embodiments provide an improvement in the technical field of LIDAR alignment for vehicles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A LIDAR-to-vehicle alignment system, comprising:
a sensor data collection module configured to collect points of data provided based on outputs of one or more LIDAR sensors; and
an alignment module configured to
identify lane markings based on the points of data,
determine a lane marking direction based on the identified lane markings,
calculate a yaw of a LIDAR coordinate system relative to a vehicle coordinate system based on the determined lane marking direction,
identify a ground plane based on the points of data,
calculate a roll and pitch of the LIDAR coordinate system relative to the vehicle coordinate system based on the identified ground plane,
update a transformation matrix based on the calculated yaw, roll, and pitch of the LIDAR coordinate system, and
not update the transformation matrix when the vehicle is accelerating, not update the transformation matrix when the vehicle is decelerating, not update the transformation matrix when the vehicle is turning, and not update the transformation matrix when the vehicle is on a road surface that is not flat.

2. The system of claim 1, further comprising an autonomous driving module configured to perform one or more autonomous driving operations based on the transformation matrix.

3. The system of claim 1, wherein the alignment module is configured to determine whether at least one enablement condition is met prior to calculating the yaw, roll, and pitch of the LIDAR coordinate system.

4. The system of claim 1, wherein the alignment module is configured to identify the lane markings based on an intensity threshold.

5. The system of claim 4, wherein the alignment module is configured to dynamically determine the intensity threshold based on intensities of points of data in a predetermined region of interest.

6. The system of claim 1, wherein the alignment module is configured to determine the lane marking direction using principal component analysis.

7. The system of claim 1, wherein the alignment module is configured determine a normal to the ground plane and calculate the roll and the pitch based on the normal to the ground plane.

8. The system of claim 7, wherein the alignment module is configured to determine the normal to the ground plane using principal component analysis.

9. The system of claim 1, wherein the alignment module is configured to identify statistical outliers in the calculated yaw, roll, and pitch and remove the statistical outliers from the update to the transformation matrix.

10. A method of performing LIDAR-to-vehicle alignment, the method comprising:
collecting points of data provided based on outputs of one or more LIDAR sensors;
identifying lane markings based on the points of data;
determining a lane marking direction based on the identified lane markings;
calculating a yaw of a LIDAR coordinate system relative to a vehicle coordinate system based on the determined lane marking direction;
identifying a ground plane based on the points of data;
calculating a roll and pitch of the LIDAR coordinate system relative to the vehicle coordinate system based on the identified ground plane;
updating a transformation matrix based on the calculated yaw, roll, and pitch of the LIDAR coordinate system, and
not updating the transformation matrix when the vehicle is accelerating, not updating the transformation matrix when the vehicle is decelerating, not updating the transformation matrix when the vehicle is turning, and not updating the transformation matrix when the vehicle is on a road surface that is not flat.

11. The method of claim 10, further comprising performing one or more autonomous driving operations based on the transformation matrix.

12. The method of claim 10, further comprising determining whether at least one enablement condition is met prior to calculating the yaw, roll, and pitch of the LIDAR coordinate system.

13. The method of claim 10, further comprising identifying the lane markings based on an intensity threshold.

14. The method of claim 13, further comprising dynamically determining the intensity threshold based on intensities of points of data in a predetermined region of interest.

15. The method of claim 10, further comprising determining the lane marking direction using principal component analysis.

16. The method of claim 10, further comprising determining a normal to the ground plane and calculating the roll and the pitch based on the normal to the ground plane.

17. The method of claim 16, further comprising determining the normal to the ground plane using principal component analysis.

18. The method of claim 10, further comprising identifying statistical outliers in the calculated yaw, roll, and pitch and removing the statistical outliers from the update to the transformation matrix.

19. A LIDAR-to-vehicle alignment system, comprising:
a sensor data collection module configured to collect points of data provided based on outputs of one or more LIDAR sensors;
an alignment module configured to
identify lane markings based on the points of data,
determine a lane marking direction based on the identified lane markings,
calculate a yaw of a LIDAR coordinate system relative to a vehicle coordinate system based on the determined lane marking direction,
identify a ground plane based on the points of data,
calculate a roll and pitch of the LIDAR coordinate system relative to the vehicle coordinate system based on the identified ground plane,
update a transformation matrix based on the calculated yaw, roll, and pitch of the LIDAR coordinate system, and
not update the transformation matrix when the vehicle is accelerating, not update the transformation matrix when the vehicle is decelerating, not update the transformation matrix when the vehicle is turning, and not update the transformation matrix when the vehicle is on a road surface that is not flat,
an autonomous driving module configured to perform one or more autonomous driving operations based on the transformation matrix,
wherein the alignment module is configured to determine whether at least one enablement condition is met prior to calculating the yaw, roll, and pitch of the LIDAR coordinate system,
wherein the alignment module is configured to identify the lane markings based on an intensity threshold,
wherein the alignment module is configured to determine the lane marking direction using principal component analysis,
wherein the alignment module is configured determine a normal to the ground plane and calculate the roll and the pitch based on the normal to the ground plane, and
wherein the alignment module is configured to identify statistical outliers in the calculated yaw, roll, and pitch and remove the statistical outliers from the update to the transformation matrix.

20. The system of claim 19, wherein the alignment module is configured to dynamically determine the intensity threshold based on intensities of points of data in a predetermined region of interest, and
wherein the alignment module is configured to determine the normal to the ground plane using principal component analysis.

* * * * *